United States Patent [19]

Finley

[11] Patent Number: 4,567,319
[45] Date of Patent: Jan. 28, 1986

[54] LIGHTWEIGHT CURRENT-CARRYING HOSE

[75] Inventor: Richard O. Finley, Upland, Calif.

[73] Assignee: Plastiflex Company International, Fountain Valley, Calif.

[21] Appl. No.: 506,375

[22] Filed: Jun. 21, 1983

Related U.S. Application Data

[63] Continuation-in-part of Ser. No. 454,035, Dec. 28, 1982, abandoned.

[51] Int. Cl.[4] .................. F16L 11/11; F16L 11/12; A47L 9/24
[52] U.S. Cl. ................................ 174/47; 138/122; 138/129
[58] Field of Search ............... 174/47, 68 C, 70 C, 174/72 C, 95, 97; 138/103, 122, 129, 154; 361/215; 350/96.23

[56] References Cited

U.S. PATENT DOCUMENTS

| | | | |
|---|---|---|---|
| 2,066,242 | 12/1936 | Abbott | 174/72 C X |
| 3,255,780 | 6/1966 | Squirrell | 138/122 |
| 3,498,286 | 3/1970 | Polanyi et al. | 350/96.23 X |
| 4,110,001 | 8/1978 | Olszewski et al. | 350/96.23 |
| 4,119,123 | 10/1978 | Samuéls | 138/122 |
| 4,153,332 | 5/1979 | Longoni | 350/96.23 |
| 4,310,946 | 1/1982 | Baker et al. | 138/122 X |
| 4,354,051 | 10/1982 | Kutnyak | 138/129 X |
| 4,388,800 | 6/1983 | Trezeguet et al. | 350/96.23 X |

FOREIGN PATENT DOCUMENTS

| | | | |
|---|---|---|---|
| 1131518 | 10/1956 | France | 174/68 C |
| 809112 | 2/1959 | United Kingdom | 174/47 |
| 1583276 | 1/1981 | United Kingdom | 350/96.23 |

*Primary Examiner*—Laramie E. Askin
*Attorney, Agent, or Firm*—Lewis B. Sternfels

[57] ABSTRACT

One or more electric conductors (36, 236) in a flexible hose (10, 210) are protected from tensile and compressive forces exerted on or by the hose by providing an enclosure (32, 232) for the conductor(s) whose radial dimension (46, 246) provides a path for movement of the conductor(s) that is greater than any movement thereon exerted on or by the hose which might otherwise harm or break the conductor(s).

20 Claims, 5 Drawing Figures

LIGHTWEIGHT CURRENT-CARRYING HOSE

CROSS REFERENCE TO RELATED APPLICATIONS

This is a continuation-in-part of application Ser. No. 454,035 filed 28 Dec. 1982, now abandoned.

FIELD OF THE INVENTION

The present invention relates to a flexible tube in combination with a non-structurally supporting conductor or conductors of electromagnetic energy.

DESCRIPTION OF THE PRIOR ART AND BACKGROUND CONSIDERATIONS

A prevalent tube or hose construction comprises one or more elongated strips which are helically wound about an axis and bonded at adjacent convolutions into tubular form. A number of such hoses incorporate electrical conductors and, many times, the conductors are extruded or otherwise formed into the elongated strip or strips prior to the time when the strip is convoluted helically into tubular shape.

Such convoluting creates great tensile and compressive forces which are exerted upon the conductor. As a consequence, the conductor may be stretched beyond its elastic limit and broken or, alternatively, the conductor is compressed tending to bunch it up. In addition, when the hose is bent, various portions of the hose are either compressed, or placed in tension. This further tension and compression may create further stresses on, or fatigue, the conductor and thus cause it to break.

In order to prevent breakage of the conductors, it is conventional to utilize a wire which is sufficiently massive to withstand breakage under such tension and compression. The massiveness of the wire can force the plastic of the hose to yield instead of the wire. In similar or other cases, stranded wire has been specified and single wire prohibited because stranded wire, having a twist to it, will yield and tend to untwist and lengthen upon application of tensile loads thereon to avoid breaking.

All such solutions have a common disadvantage in that they require a minimum wire gauge sufficient to resist or compensate for such forces. Thus, the gauge or number of wires is generally greater than that required by the power requirements. As a result, the amount of material and the cost of the hose is increased. Also, it flexibility is decreased.

SUMMARY OF THE INVENTION

The present invention meets or overcomes the above-noted problems by utilizing an enclosure for the conductor or conductors which is sufficiently large as to provide a space for movement of the conductor or conductors upon exertion of any tensile or compressive forces on or by the tube.

Several advantages are derived from such construction. Because the conductors are placed in an environment which permits them a relatively free movement beyond that which defines a captive space in the hose, any tensile and compressive forces exerted on or by the hose are not deleteriously exerted on the conductors. As a consequence, the conductor may be sized or otherwise constructed to that which is expressly suited to or required by power or transmission needs without any compensation in its size to increase its physical strength. Thus, the smallest gauge wire or size of conductor may be used. Further, a single rather than a stranded wire may be used. In this respect, while stranded wires are more flexible than comparable current-carrying solid wires, they are also considerably more expensive which, in a cost-conscious environment, is usually critical to making a sale. Such a construction also improves upon and enables the full use of the concepts disclosed in U.S. Pat. No. 4,310,946 (assigned to the Assignee hereof) whose principles are incorporated herein as if set forth in haec verba.

Other aims and advantages, as well as a more complete understanding of the present invention, will appear from the following explanation of exemplary embodiments and the accompanying drawings thereof.

DESCRIPTION OF THE PREFERRED EMBODIMENT

Figure 1:
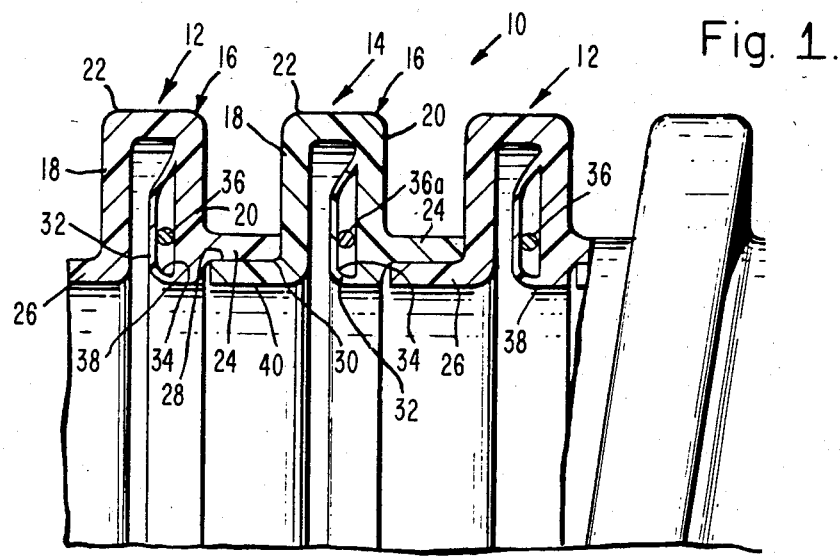
FIG. 1 illustrates one embodiment of the combination of a hose and conductors of electromagnetic energy formed in accordance with the teachings of the present invention.

As shown in FIG. 1, a hose 10 comprises a pair of adjacently placed strips 12 and 14 which are helically wound about the hose axis into tubular form. It is to be understood that one, two or more than two strips may be used. Each strip includes a central generally U-shaped segment 16 having a pair of radially extending legs 18 and 20 and a connecting crown 22. A pair of terminal legs 24 and 26 are joined respectively to radially extending legs 20 and 18 and extend in opposite axial directions. When the strips are convoluted or helically wound into tubular form, terminal leg 24 of one strip overlaps terminal leg 26 of the adjacent strip at the adjoining convolution to form overlapping surfaces 28 and 30 which are bonded to one another. Such a construction resists deformation forces exerted radially and/or axially upon the hose. In general, legs 18 and 20 resist radially-exerted crushing forces on the hose, while the double thickness of legs 24 and 26 resist axially-exerted hose crushing forces by providing greater rigidity than segments 16.

An enclosure 32 is formed on leg 20 and defines a pocket 34 whose radial length, that is its length perpendicular to the hose axis, is substantially greater than its axial thickness. One or more conductors 36 and 36a, respectively in strips 12 and 14, for carrying electromagnetic energy are loosely placed in their respective enclosures 32 for easy movement between the radial extremes of pocket 34. If desired, more than one conductor may be placed within an enclosure 32. As shown in FIG. 1, enclosure 32 is placed intermediate legs 18 and 20 within the inside of U-shaped segment 16. In addition, an exterior surface 38 of enclosure 32 is disposed to lie coplanar with a surface 40 of terminal leg 26. It is to be understood, however, that enclosure 32 may be placed on leg 18 rather than leg 20.

Figure 2A:
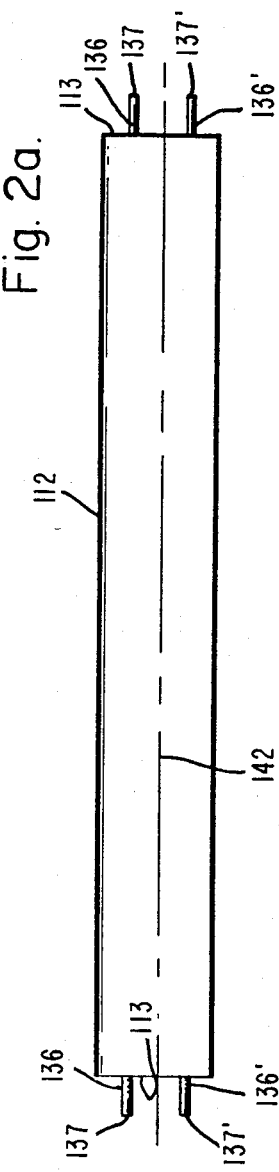
FIGS. 2a and 2b, respectively, illustrate equal lengths of unconvoluted and bent strips with equal lengths of wires therein to illustrate contracting and expanding movement of the conductors with respect to the strip when it is bent.
Figure 2B:
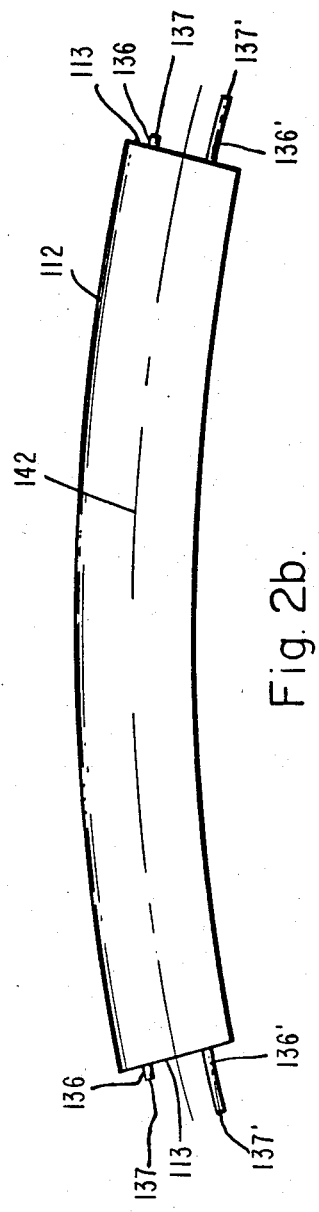

The radial dimension of pocket 34 is an important feature of the present invention, regardless of the time when conductor 36 or 36a is placed within pocket 34 of strip 12 or 14, that is, either when it is extruded or thereafter, and especially prior to the strip's helical convolution into a hose. Reference to FIGS. 2a and 2b illustrate the reasons which explain this important feature. FIG. 2a illustrates a strip 112 in its unconvoluted condition and incorporates a pair of wires 136 and 136' which are placed and slidably held in position on either side of the strip's center of mass 142. A center of mass is defined as that portion of the strip on an axis which is perpendicular to the strip's length and about which the strip portion is neither compressed nor stretched when it is bent. It need not be at the geometric center of the strip. The lengths of wires 136 and 136' between their respective ends 137 and 137' are equal in both FIGS. 2a and 2b. Also, the length of strip 112 between its ends 113 is also equal in both FIGS. 2a and 2b. In FIG. 2a, ends 137 and 137' respectively of wires 136 and 136' are shown to extend equally from ends 113 of strip 112. When strip 112 is bent, as illustrated in FIG. 2b, that strip portion above center of mass 142 is stretched so that ends 137 of wire 136 are pulled inwardly with respect to strip ends 113, while that strip portion below center of mass 142 is compressed so that ends 137' of wire 136' are forced further outwardly from strip ends 113. If ends 137 and 137' of the respective wires were held fixed with respect to ends 113 of strip 112, it is apparent that wire 136 would be placed in great tension and possibly break, while wire 136' would tend to be bunched up under compression. It is the main purpose of the present invention to prevent either tensile or compressive forces to be exerted on the wires.

In addition to the need to compensate for the problem of shortening or lengthening of the wire when the wire is not on the center of mass of the strip, it has also been determined that the center of mass will move upon helical convolution of the strip and bonding thereof when formed as the hose. This phenomenon is illustrated in conjunction with FIG. 3, in which the unconvoluted strip is represented only in full lines and the convoluted and bonded strip is represented by both full and dashed lines. Strip 12 in its unconvoluted condition has a center of mass which is shown to extend along dotted line 144. After the strip has been convoluted and bonded together in its tubular shape, the center of mass moves to a position denoted by line 144'. This movement is dependent upon two occurrences. The first is a stretching of the strip in which its crown 22 may be somewhat stretched and its legs 24 and 26 somewhat compressed. Therefore, the center of mass will move to the extent that the material of the strip is stretched and compressed. In addition, when legs 24 and 26 are bonded together, they form a greater thickness of material along with the bond material. This bonded construction is, therefore, thicker and less subject to yielding upon bending of the hose. Therefore, these two conditions of stretching and compression of portions of the strip, as well as thickening of other sections through bonding, causes the center of mass to move from its original position depicted by line 144 to its final position as depicted by line 144'. This distance is denoted by dimension 44. Therefore, the radial dimension of pocket 34 should be at least that of dimension 44 between the original and final locations of the center of mass. However, to avoid possible miscalculation, a radial length 46 of pocket 34 is made greater than dimension 44. In general, such a dimension 46 of pocket 34 incorporates a substantial lemgth of leg 18 or 20 and preferably is greater than one-half the leg's length, but not so long which would interfere with the flexure of the hose at crown 22 and other portions of the strip.

Figure 3:
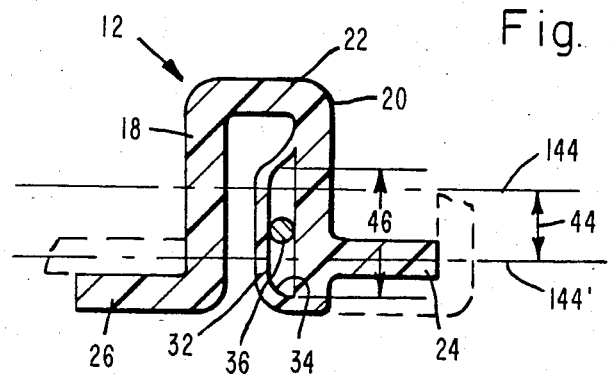
FIG. 3 depicts a cross-section of the FIG. 1 embodiment of the strip and its contained conductor to compensate for such contraction and expansion of the conductor, in which the unconvoluted strip is represented only by full lines and the convoluted and bonded strip or strips are represented by both full and dashed lines.
Figure 4:
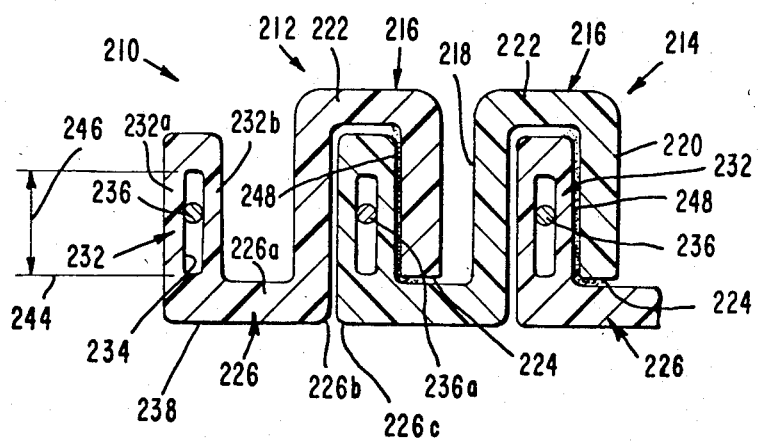
FIG. 4 shows a further embodiment of the present invention illustrated as a hose formed from two strips configured differently from that illustrated in FIG. 1, with a conductor carried by each strip.

Referring now to the embodiment shown in FIG. 4, a hose 210 is illustrated as comprising a pair of strips 212 and 214, although one or three or more strips may be used, whose configuration presents advantages over those of the embodiment of FIGS. 1 and 3 in strip and hose shape, manufacture, economy of material, and resistance to radial crush and deformation, as will become appreciated hereafter.

Each strip 212 and 214 includes a generally U-shaped or hook-shaped end segment or cover 216 comprising a pair of radially extending legs 218 and 220 and a crown 222. Segment leg 220 terminates at one end 224. Other segment leg 218 is connected by an axially extending base leg 226 with a radially extending enclosure 232. Enclosure 232 includes radially extending sides 232a and 232b which define the sides of a pocket 234 for housing one or more conductors, with single conductors 236 and 236a being specifically depicted in their respective strips 212 and 214. Each pocket 234 has a radial dimension 246 which is greater than the movement of the center of mass extending along a line similar to line 144 or line 144' depicted in FIG. 3 for the same reasons as those presented above with respect to FIGS. 2a, 2b and 3. For economy in the use of material and length of hose, the axial dimension of pocket 234, and likewise of pocket 34 of FIGS. 1 and 3, is less than that of its radial dimension, but this need not be a necessary constraint if, for example, the number of conductors placed within the pocket so requires an expansion axial dimension for the pocket. Further, cover or segment 216 defines an internal space having a specific dimension and configuration which is preferably substantially the same as that of enclosure 232.

When one or more strips are convoluted into hose 210, enclosure 232 of a convolution fits conformally within cover 216 of an adjacent convolution because of their preferably similar dimensions and configurations. A bonding material 248 is placed between the facing radial surfaces of leg 220 and side 232b of enclosure 232 to bond adjacent convolutions of strips 212 and 214 together in a manner similar to that described, for example, in U.S. Pat. No. 3,255,780.

The embodiment of FIG. 4 incorporates all the advantages of that of FIGS. 1 and 3 and provides additional ones. For example, the double thickness of bonded-together axial legs 24 and 26 provide an enhanced resistance to axially-exerted crushing forces on hose 10. A similar result is obtainable in the embodiment of hose 210 shown in FIG. 4; all that is required is to increase the thickness of base leg 226. However, if it is determined that similar resistance to axial-exerted forces is desired without a decrease in flexibility otherwise resulting from an increased leg thickness, leg 226 may be shortened to decrease its axial length, so that radially extending legs 218 and 220 of adjacent convolutions contact or are positioned closer to one another than depicted. The embodiment of FIGS. 1 and 3 may be somewhat limited in this respect because legs 24 and 26 require a minimum of contact between their overlapping surfaces 28 and 30 for adequate bonding therebetween. Such a requirement is not needed in FIG. 4.

More importantly, the embodiment of FIG. 4 enables it to utilize more fully the proven advantageous principles of the construction and flexibility of the invention described in U.S. Pat. No. 3,255,780. Specifically, those elements, of strip 212 and 214 identified by indicia 226a and 218 connecting base leg 226 with crown 222, impart flexibility and support to hose 210. Accordingly, elements 226a and 218 and crown 222 and their connecting hinge-like corners, including the corner between leg 220 and crown 222, may be termed flexible elements. Also, legs 218 and 220 and radial sides 232a and 232b of enclosure 232 may be termed support elements in that they help to resist radially-exerted crushing forces on hose 210. In this respect, because of the preferable close fit of enclosure 232 within cover or segment 216, the two cooperate to enhance the resistance of the tube or hose against radial crush.

Further, by placing enclosure 232 at an end of the strip, it is easier to extrude the strip. By locating bond 248 between enclosure side 232b and leg 220, manufacture of the hose is facilitated. For example, the interlocking hook arrangement of cover 216 with enclosure 232 forms a mechanical connection which holds the part together during convolution of the strip or strips into a hose or tube for a time sufficient for the bonding material at 248 to solidify and tightly bond the surfaces together without slippage or other movement therebetween. Also, abutment between facing edges 226b and 226c of base leg 226 is more easily effected to resist axial crush on the hose and to further ensure a smooth inner hose wall defined by surface 238 of base leg 226.

Although the invention has been described with reference to particular embodiments thereof, it should be realized that various changes and modifications may be made therein without departing from the spirit and scope of the invention.

I claim:

1. In a combination of a flexible tube with means defining at least one conductor of electromagnetic energy, in which said tube comprises at least one elongated strip helically wound about an axis into tubular form and said conductor means has a length approximately that of said strip, and in which said strip includes at least two radially-extending components positioned generally normal to the tube axis and generally adjacent to one another, the improvement in said combination for enabling substantially all tensile and compressive forces exerted on or by said tube from being deleteriously exerted on said conductor means, comprising:

an enclosure on one of said radially-extending components for said conductor means extending along the length of said helically wound strip and having dimensions generally parallel and perpendicular to the axis, said parallel dimension being approximately equal to the axial width of said conductor means, and said perpendicular dimension providing a generally central portion for said conductor means when said tube is relatively unbent and a radially-extending path for bidirectional movement of said conductor means that is greater than any movement thereon exerted on or by said tube which would otherwise deleteriously affect said conductor means.

2. A combination according to claim 1 in which said enclosure comprises a portion of said strip.

3. A combination according to claim 2 in which said strip comprises an extrusion with said conductor means placed in said enclosure during extrusion of said strip.

4. A combination according to claim 1 in which said tube comprises a plurality of said strips helically wound about the axis into tubular form, each of said strips containing one of said conductor means.

5. A combination according to claim 1 in which said conductor means is sized exclusively in accordance with the electromagnetic energy which it is intended to carry.

6. A combination according to claim 1 wherein said strip has a center of mass that moves a distance when said strip is bent, in which the enclosure dimension perpendicular to said axis is at least as great as the distance of center of mass movement.

7. A combination according to claim 1 in which said strip comprises, in cross-section, an axially extending base leg having first and second ends with said enclosure secured to said first end, and a cover secured to said second end and adapted to overlap said enclosure at adjacent convolutions of said strip when convoluted into said tube.

8. A combination according to claim 7 in which said cover comprises a pair of radially extending legs joined by a crown, with one of said components comprising one of said radially-extending legs and with a first of said legs joined to said second end and a second of said legs bonded to said enclosure of an adjacent strip convolution.

9. A combination according to claim 8 wherein said base layer includes a substantially flat surface which forms a flat, substantially smooth interior tube surface when formed from strip convolutions.

10. A combination according to claim 8 wherein said enclosure includes radially extending sides which, with said radially extending legs of said cover, enhance resistance of said tube to any radially-exerted crushing forces thereon.

11. A combination according to claim 10 in which said axially extending base leg is shortened to enable close placement of said radially extending sides and legs for enhancing resistance of said tube to any axially-exerted crushing forces thereon.

12. A combination according to claim 1 wherein said radially-extending components are so positioned with respect to one another on said strip as to provide mutual movement with respect to one another and flexibility to said tube when said tube is bent.

13. In a combination of a flexible tube with means defining at least one conductor of electromagnetic energy, wherein said tube comprises at least one elongated strip helically wound about an axis into tubular form and said conductor means has a length approximately that of said strip, wherein said strip includes at least two radially-extending components positioned generally normal to the tube axis and generally adjacent to one another, and wherein said strip before and after being helically wound into said tube has centers of mass which are differently positioned, the improvement in said combination for enabling substantially all tensile and compressive forces exerted on or by said tube from being deleteriously exerted on said conductor means, comprising:

an enclosure on one of said radially-extending components for said conductor means extending along the length of said helically wound strip and having a dimension generally perpendicular to the axis for providing a generally central portion for said conductor mens when said tube is relatively unbent and a radially-extending path for bidirectional movement of said conductor means that is greater than any movement thereon exerted on or by said tube which would otherwise deleteriously affect said conductor means, said enclosure dimension being at least equal to the distance between the centers of mass to permit movement of said conductor means in said enclosure in response to the tensile and compressive forces exerted on or by said tube.

14. A combination according to claim 13 wherein said radially-extending components are so positioned with respect to one another on said strip as to provide mutual movement with respect to one another and flexibility to said tube when said tube is bent.

15. In a combination of a flexible tube with means defining at least one conductor of electromagnetic energy, in which said tube comprises at least one elongated strip helically wound about an axis into tubular form and said conductor means has a length approximately that of said strip, the improvement in said combination for enabling substantially all tensile and compressive forces exerted on or by said tube from being deleteriously exerted on said conductor means, comprising:

an enclosure for said conductor means extending along the length of said helically wound strip and having a dimension generally perpendicular to the axis to provide a path for movement of said conductor means that is greater than any movement thereon exerted on or by said tube which would otherwise deleteriously affect said conductor means; and the improvement in said strip, in which:

said strip comprises, in cross-section, a central generally U-shaped segment and a pair of terminal legs joined to said segment at its respective legs and extending in opposite axial directions therefrom, a first of said terminal legs overlapping and bonded to a second of said terminal legs at adjoining convolutions of said strip to form said tube, said enclosure being formed on one of said U-shaped segment legs.

16. A combination according to claim 15 in which said enclosure extends substantially to the crown of said U-shaped segment.

17. A combination according to claim 15 in which said enclosure extends substantially the entire length of said one U-shaped segment leg.

18. A combination according to claim 15 in which said enclosure extends over one-half the length of said one U-shaped segment leg.

19. A combination according to claim 18 in which said enclosure is positioned between said U-shaped segment legs.

20. A combination according to claim 19 wherein said enclosure extends from one of said terminal legs and includes an exterior surface which lies coplanar with a surface on said one terminal leg.

* * * * *